United States Patent
Shaik

(10) Patent No.: US 9,659,073 B2
(45) Date of Patent: May 23, 2017

(54) TECHNIQUES TO EXTRACT AND FLATTEN HIERARCHIES

(75) Inventor: Sadiq Shaik, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 745 days.

(21) Appl. No.: 12/141,409

(22) Filed: Jun. 18, 2008

(65) Prior Publication Data

US 2009/0319546 A1 Dec. 24, 2009

(51) Int. Cl.
*G06F 17/00* (2006.01)
*G06F 17/30* (2006.01)

(52) U.S. Cl.
CPC .. *G06F 17/30569* (2013.01); *G06F 17/30563* (2013.01)

(58) Field of Classification Search
CPC .............. G06F 17/30569; G06F 17/30563
USPC .............. 707/602, 607, 809, 829, E17.039
See application file for complete search history.

(56) References Cited

U.S. PATENT DOCUMENTS

| | | | | |
|---|---|---|---|---|
| 5,533,148 A * | 7/1996 | Sayah | ............... | G06T 17/005 382/240 |
| 5,875,446 A | 2/1999 | Brown et al. | | |
| 5,960,194 A * | 9/1999 | Choy | ............... | G06F 9/355 |
| 6,141,729 A | 10/2000 | Ishida et al. | | |
| 6,161,103 A * | 12/2000 | Rauer | ............... | G06Q 30/02 |
| 6,189,004 B1 * | 2/2001 | Rassen | ............... | G06F 17/30392 |
| 6,212,524 B1 * | 4/2001 | Weissman | ......... | G06F 17/30592 707/600 |
| 6,240,407 B1 * | 5/2001 | Chang | ............... | G06F 17/30911 707/711 |
| 6,424,972 B1 * | 7/2002 | Berger | ............... | H03M 7/24 |
| 6,496,842 B1 * | 12/2002 | Lyness | ............... | G06F 3/0482 707/E17.012 |
| 6,502,101 B1 * | 12/2002 | Verprauskus | ..... | G06F 17/30569 |
| 6,604,099 B1 * | 8/2003 | Chung | ............... | G06F 17/30864 |
| 6,961,909 B2 * | 11/2005 | Lord | ............... | G06F 17/30961 707/999.104 |
| 7,028,037 B1 * | 4/2006 | Agarwal | ........... | G06F 17/30421 |
| 7,321,939 B1 | 1/2008 | Porter | | |
| 7,571,182 B1 * | 8/2009 | Eddy | ............... | G06F 17/30595 |
| 7,657,576 B1 * | 2/2010 | Norcott | ............... | 707/999.202 |

(Continued)

OTHER PUBLICATIONS

Alvaro, Peter, et al., "Towards Scalable Architectures for Clickstream Data Warehousing", DNIS 2007, LNCS 4777, Springer-Verlag, Berlin, Germany, © 2007, pp. 154-177.*

(Continued)

*Primary Examiner* — Robert Stevens
(74) *Attorney, Agent, or Firm* — Kilpatrick Townsend & Stockton LLP

(57) ABSTRACT

Techniques for extracting hierarchical data stored in multiple records, flattening the hierarchical data, and storing the flattened data in a data warehouse. The data source may be an online transaction processing (OLTP) system that is designed to perform transaction processing and that stores hierarchy data in the form of multiple parent-child relationship records. The hierarchy data extracted from the data source is flattened and stored in a flattened form in a target system such as a data warehouse. A database function such as the SYS_CONNECT_BY_PATH may be used as part of the flattening process.

21 Claims, 5 Drawing Sheets

(56) References Cited

U.S. PATENT DOCUMENTS

| | | | |
|---|---|---|---|
| 7,701,877 B1* | 4/2010 | Rozenman | H04L 41/12 370/254 |
| 7,720,804 B2* | 5/2010 | Fazal et al. | 707/601 |
| 7,831,574 B2* | 11/2010 | Pareek | G06F 17/30563 707/703 |
| 8,352,458 B2* | 1/2013 | Aggarwal | G06F 17/30489 707/713 |
| 8,380,657 B2 | 2/2013 | Shaik et al. | |
| 2001/0047372 A1* | 11/2001 | Gorelik et al. | 707/514 |
| 2002/0143783 A1* | 10/2002 | Bakalash | G06F 17/30457 |
| 2002/0194167 A1* | 12/2002 | Bakalash | C03B 37/02718 |
| 2003/0018642 A1* | 1/2003 | Bakalash | G06F 17/30489 |
| 2004/0107315 A1 | 6/2004 | Watanabe et al. | |
| 2004/0133552 A1* | 7/2004 | Greenfield | G06F 17/3041 |
| 2005/0015383 A1* | 1/2005 | Harjanto | G06F 17/30595 |
| 2005/0027683 A1* | 2/2005 | Dill | G06F 17/30539 |
| 2005/0038831 A1 | 2/2005 | Souder et al. | |
| 2005/0060300 A1* | 3/2005 | Stolte | G06F 17/30554 |
| 2005/0165733 A1* | 7/2005 | Strovink | G06F 17/30457 |
| 2005/0216430 A1* | 9/2005 | Marcjan | 707/1 |
| 2005/0223109 A1 | 10/2005 | Mamou et al. | |
| 2005/0251533 A1 | 11/2005 | Harken et al. | |
| 2005/0253739 A1 | 11/2005 | Hu et al. | |
| 2006/0015521 A1 | 1/2006 | Howey et al. | |
| 2006/0036633 A1* | 2/2006 | Chong | G06F 17/30734 |
| 2007/0005154 A1* | 1/2007 | Lancaster | G06F 17/30539 700/49 |
| 2007/0027904 A1* | 2/2007 | Chow | G06F 17/30592 |
| 2007/0112889 A1* | 5/2007 | Cook et al. | 707/204 |
| 2007/0233644 A1* | 10/2007 | Bakalash et al. | 707/2 |
| 2008/0005713 A1 | 1/2008 | Singh et al. | |
| 2008/0126552 A1 | 5/2008 | Berger et al. | |
| 2008/0288937 A1 | 11/2008 | Waterkamp | |
| 2009/0089078 A1 | 4/2009 | Bursey | |
| 2009/0119637 A1 | 5/2009 | Ganapathy | |
| 2009/0313281 A1* | 12/2009 | Lowry | 707/102 |
| 2009/0319546 A1* | 12/2009 | Shaik | 707/101 |
| 2010/0036771 A1 | 2/2010 | Daniel et al. | |
| 2010/0082532 A1 | 4/2010 | Shaik et al. | |
| 2010/0103816 A1 | 4/2010 | Eiro | |

OTHER PUBLICATIONS

Ayres, Robert, et al., "Querying Graph Databases Using a Functional Language Extended with Second Order Facilities", Advances in Databases, LNCS 1094, Springer-Verlag, Berlin, Germany, © 2005, pp. 189-203.*
Dillon, S., et al., "Chapter 17: Advanced Querying", Beginning Oracle Programming, © Apress 2002, pp. 661-704.*
Oracle Database SQL Reference, 10g Release 2 (10.2), B14200-02, © 2005 Oracle, 22 pages.*
Dori, Dov, et al., "Transforming an Operational System Model to a Data Warehouse Model: A Survey of Techniques", SwSTE 2005, Herzlia, Israel, Feb. 22-23, 2005, pp. 47-56.*
Moody, Daniel L., et al., "From Enterprise Models to Dimensional Models: A Methodology for Data Warehouse and Data Mart Design", DMDM 2000, Stockholm, Sweden, Jun. 5-6, 2000, CEUR Workshop Proceedings, vol. 28, Article 5, pp. 1-12, pp. 367-375.*
Nelson, Gregory S. Barnes, "Implementing a Dimensional Data Warehouse with the SAS System", SAS Users Group International, San Diego, CA, © 1999, pp. 154-163.*
Das, Souripriya, et al., "Supporting Ontology-based Semantic Matching in RDBMS", Proc. of the 30th VLDB Conference, Toronto, Canada, © 2004, pp. 1054-1064.*
Cuzzocrea, Alfredo, et al., "A Hierarchy-Driven Compression Technique for Advanced OLAP Visualization of Multidimensional Data Cubes", DaWaK 2006, LNCD 4081, Springer-Verlag, Berlin, Germany, (c) 2006, pp. 106-119.*
Graham, Neill, Introduction to Computer Science: A Structured Approach, 2nd Edition, West Publishing Company, St. Paul, MN, © 1982, pp. 173, 185-187 and 302-305.*
Kernighan, Brian W., et al., The C Programming Language, Prentice-Hall, Inc. Englewood Cliffs, NJ, © 1978, pp. 3, 84-85, 130-134 and 186.*
The Microsoft Dictionary, 4th Edition, Microsoft Press, Redmond, WA, © 1999, pp. 71, 218, 377 and 390.*
Phipps, Cassandra, et al., "Automating Data Warehouse Conceptual Schema Design and Evaluation", DMDW 2002, vol. 2, May 2002, 10 pages.*
"ETL Tools, METAspectrum[SM] Evaluation," METAspectrum[SM] Market Summary, METAspectrum 52.1, pp. 1-3.
"Data Warehousing: ETL vs. ELT," McLean Report Research Note, Published Jun. 12, 2007, 1998-2008 Info-Tech Research Group, 4 pages.
Goodman, N., "Pentaho Data Integration: Scaling Out Large Data Volume Processing in the Cloud or on Premise," a Bayon Technologies Inc. White Paper, PDI Scale Out White Paper, 2009, pp. 1-20.
"Hierarchical Data, Connecting Rows," Dec. 7, 2006, printed on Apr. 3, 2008, at URL: http://www.sqlsnippets.com/en/topic-10919.html, pp. 1-6.
"Hierarchical Queries," Oracle Database SQL Reference 10g Release 2 (10.2), Product No. B14200-02, Dec. 2005, pp. 9-2 to 9-7.
"Hierarchical Data, SYS_CONNECT_BY_PATH," Aug. 12, 2007, printed on Apr. 3, 2008, at URL: http://www.sqlsnippets.com/en/topic-12568.html, pp. 1-4.
Montcheuil, "Third Generation ETL: Delivering the Best Performance," What Works Publication, Nov. 2005, vol. 20, printed on Apr. 4, 2008 at URL: http://www.tdwi.org/Publications/WhatWorks/display.aspx?ID=7726, pp. 1-3.
"Setting Up Security for an Integration Project—What to Consider," An Oracle Data Integrator Technical Brief, updated Dec. 2006, copyright 2007, 5 pages.
Songini, M. L., "QuickStudy: Extract, Transform and Load (ETL)," Computerworld Business Intelligence, Feb. 2, 2004, pp. 1-2, dowloaded on Dec. 29, 2009 at URL: http://www.computerworld.com/s/article/print/89534/QuickStudy_ETL?taxonomyName=Data+W.
"SYS_CONNECT_BY_PATH," Oracle Database SQL Reference 10g Release 2 (10.2), Product No. B14200-02, Dec. 2005, pp. 5-175 to 5-176.
Notice of Allowance for U.S. Appl. No. 12/562,326 (Nov. 20, 2012).
Final Office Action for U.S. Appl. No. 12/562,326, mailed on Mar. 30, 2012, 15 pages.
Non-Final Office Action for U.S. Appl. No. 12/562,326, mailed on Nov. 25, 2011, 16 pages.
Office Action for U.S. Appl. No. 12/562,326, mailed on Aug. 16, 2012.

* cited by examiner

TECHNIQUES TO EXTRACT AND FLATTEN HIERARCHIES

BACKGROUND OF THE INVENTION

The present application relates to techniques for extracting and storing hierarchy data, and more particularly to techniques for extracting hierarchy data from a data store, flattening the hierarchy data, and storing the flattened hierarchy data in a target data store.

ETL (data Extraction, Transformation, and Loading) processes are commonly used to extract data from data sources, perform transformations on the extracted data, and to load the transformed data into one or more target data stores. Various ETL tools may be provided as part of an ETL tier that is configured to perform the extraction, transformation, and loading operations. Examples of ETL tools include Informatica Power Center, Oracle Data Integrator, and IBM WebSphere Datastage, and others. The data sources from which data is extracted may be databases (such as Oracle databases), applications, flat files, and the like. The target data store where the data is stored may include databases, flat files, and the like. In a typical ETL process, desired data is identified and extracted from one or more data sources. The extracted data is then transformed and the transformed data is then loaded into the target data store. Data transforms are often the most complex and, in terms of processing time, the most costly part of an ETL process. The transformations can range from simple data conversions to extremely complex transformations.

ETL processes are commonly used where the data sources are online transaction processing (OLTP) systems and the target data store is a data warehouse. For example, the target data store may be a sales analysis data warehouse and a data source might be an order entry system that records all of the current order activities. A data warehouse is a data store that is designed for query and analysis rather than for transaction processing. A data warehouse usually stores historical data derived from transaction data, it can also include data from other sources. Data warehouses are designed to accommodate ad hoc queries and data analysis and enable separation of analysis workload from transaction workload. A data warehouse enables an organization to consolidate data from various sources.

A common problem faced by ETL designers is how to convert hierarchy data stored in the form of parent-child relationships in a relationship table spanning several rows in a data source (such as an OLTP system) and transform that to a single row that can be stored in the target data warehouse, where the single row identifies a hierarchical path in the hierarchy. ETL designers have to design tools to "flatten" hierarchy data extracted from a data source and store the flattened information into a data warehouse (this problem is sometimes also referred to as how does one perform row-column transpose). This is a very common problem that is faced by ETL designers in various environments in which hierarchies are used such as in applications such as financial applications (e.g., use of value set hierarchies in Oracle applications) that may store cost-center hierarchy data, human resources management applications that may use management reporting hierarchy information, inventory applications that use product hierarchies data, and the like.

Traditionally, flattening of hierarchies is done by the ETL tier using a row-by-row processing approach. This approach is favored by ETL developers (e.g., developers using ETL tools provided by Informatica) due to its ease of implementation. In the row-by-row approach, such as the one used by Informatica, the ETL tier is configured to extract the multiple rows storing parent-child relationships for a hierarchy one at a time. Informatica expressions "remember" the values of the fields in a "previous" parent-child record. Using the principle of induction, a record is created by the ETL tier in an Informatica expression to store values remembered from the previous records by stacking the records sideways. A record set, containing information about many hierarchies, sorted by hierarchy identifier, is fed to such an expression. As each parent-child relationship record within a hierarchy passes through the expression, a hierarchy emerges incrementally at the output layer of the ETL tier. Markers are used to distinguish different hierarchies within a record set containing many hierarchies and filters are used to discard partially constructed hierarchies. In this way, programmers use this design pattern to build a hierarchy to be stored in a data warehouse by accessing the parent-child relationship information that is spread across many records in the data source.

The traditional row-by-row processing solution discussed above has several shortcomings. The row-by-row processing creates a bottleneck in the ETL tier and slows down the ETL operations. The processing also requires substantial processing resources in the ETL tier. Further, this approach cannot be supported in an ELT architecture (as opposed to an ETL architecture), where the transformation phase is performed in the data warehouse or in a staging warehouse, since there is no way to access the values in the field values in the previous record in a sequential record set. In the ELT world, necessity dictates that an alternative method be designed to flatten hierarchies, within the constraints of database features.

Techniques are thus desired that improve the processing time needed for flattening hierarchies for loading into a data warehouse.

BRIEF SUMMARY OF THE INVENTION

Embodiments of the present invention provide improved techniques for extracting hierarchical data stored in multiple records, flattening the hierarchical data, and storing the flattened data in a data warehouse. The data source may be an online transaction processing (OLTP) system that is designed to perform transaction processing and that stores hierarchy data in the form of multiple parent-child relationship records. The hierarchy data extracted from the data source is flattened and stored in a flattened form in a target system such as a data warehouse. A database function such as the SYS_CONNECT_BY_PATH may be used as part of the flattening process.

According to an embodiment of the present invention, techniques are provided for facilitating storage of information for a hierarchy comprising a plurality of components. A first set of strings is generated based upon hierarchy data for the hierarchy stored in a plurality of records, each record in the plurality of records identifying a parent-child relationship between two components in the hierarchy, the first set of strings representing hierarchical paths in the hierarchy. One or more records are created for one or more strings from the first set of strings.

According to an embodiment of the present invention, a second set of strings may be determined from the first set of strings by applying a filter to the first set of strings, and a record may be created for each record in the second set of strings. The second set of strings may comprise one or more strings from the first set of strings representing hierarchical paths between a root component in the hierarchy and a leaf component in the hierarchy.

In one embodiment, for each component in the hierarchy, the first set of strings comprises a string specifying a path from a root component of the hierarchy to the component.

In one embodiment, creating one or more records for one or more strings from the first set of strings may comprise, for each string in the one or more strings from the first set of strings, parsing the string to extract one or more hierarchy components from the string, and then storing the one or more hierarchy components extracted from the string in a record created for the string. In one embodiment, the storing may comprise storing each hierarchy component extracted from the string in a separate field of the record created for the string.

In one embodiment, the records created for the one or more strings from the first set of strings may be stored in a data warehouse. The generating and creating steps may also be performed at the data warehouse.

In one embodiment, the plurality of records may be stored on a data source system. In such an embodiment, the generation of the first set of strings and the creation of records may be performed on the data source system. The one or more records that are created may be stored on a target system.

In one embodiment, a SYS_CONNECT_BY_PATH function may be used to generate the first set of strings.

In another embodiment, the plurality of records may be stored in an online transaction processing system, and the records created for the one or more strings from the first set of strings may be stored in a data warehouse.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide improved techniques for extracting hierarchical data stored in multiple records, flattening the hierarchical data, and storing the flattened data in a data warehouse. The data source may be an online transaction processing (OLTP) system that is designed to perform transaction processing and that stores hierarchy data in the form of multiple parent-child relationship records. The hierarchy data extracted from the data source is flattened and stored in a flattened form in a target system such as a data warehouse.

Figure 1A:
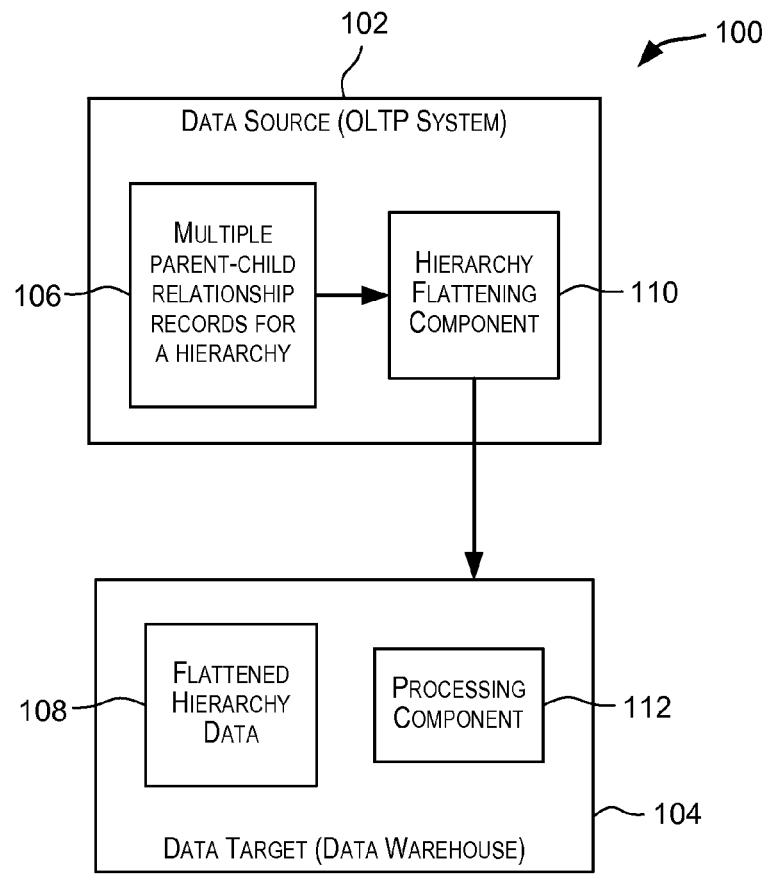
FIG. 1A depicts a simplified block diagram of a system that may incorporate an embodiment of the present invention.

FIG. 1A depicts a simplified block diagram of a system 100 that may incorporate an embodiment of the present invention. In the embodiment depicted in FIG. 1A, system 100 comprises a data source 102 from which information is extracted and a target data warehouse 104 in which the extracted information is stored. The components of system 100 depicted in FIG. 1A are meant for illustrative purposes only and are not intended to limit the scope of the invention in any manner. Alternative embodiments may have more or less components.

Data source 102 may store data in databases, applications, flat files, and the like. Data source 102 may be an online transaction processing (OLTP) system that is designed to handle transaction processing operations. For various design reasons, data related to hierarchies is quite often stored in data source 102 in the form of multiple records with each record identifying a parent-child relationship in the hierarchy. Storing hierarchy data in the form of multiple parent-child relationship records is especially commonly used in OLTP systems to optimize transaction processing time. For example, as depicted in FIG. 1A, OLTP system 102 may store multiple parent-child relationship records 106 representing a hierarchy.

Figure 2:
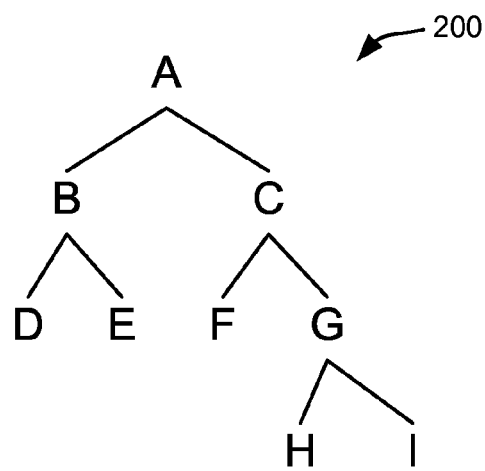
FIG. 2 depicts a sample hierarchy.

An example of how hierarchy data may be stored using multiple parent-child relationship records is shown below in Table A for hierarchy 200 depicted in FIG. 2. As depicted in FIG. 2, hierarchy 200 comprises several elements or components A, B, C, D, E, F, G, H, and I. Component A is the root of the hierarchy and components D, E, F, H, and I are the leaves (i.e., components with no children) of the hierarchy. Hierarchy 200 may be organized into levels. In one embodiment, the level for a particular component is determined based upon the number of components visited in reaching the particular component starting at the root component. For example, for hierarchy 200, component A is at level 0, components B and C are at level 1, components D, E, F, and G are at level 2, and components H and I are at level 3. A hierarchy may include several hierarchical paths. For example, there is a hierarchical path from the root component of the hierarchy to each component in the hierarchy. For example, the hierarchical paths from root A to each component in hierarchy 200 include A, A-B, A-B-D, A-B-E, A-C, A-C-F, A-C-G, A-C-G-H, and A-C-G-I.

Table A (shown below) depicts how multiple parent-child relationship records may be used to store data for hierarchy 200 depicted in FIG. 2. Each row of Table A represents a record and comprises a field "Parent" identifying the parent component, a field "Child" identifying the child component of the parent component, and a field "Leaf Node" identifying if the child component is a leaf component, and a field "Root Node" identifying if the parent component is a root node of the hierarchy. The manner in which the hierarchy data is stored in Table A is commonly used for storing hierarchy data in OLTP systems. While Table A stores data for a single hierarchy, in alternative embodiments a table in a data source may store data for multiple hierarchies.

TABLE A

Hierarchy information stored in multiple records

| Parent | Child | Leaf Node | Root Node |
|--------|-------|-----------|-----------|
| A | B |   | x |
| B | D | x |   |
| B | E | x |   |
| A | C |   | x |
| C | F | x |   |
| C | G |   |   |
| G | H | x |   |
| G | I | x |   |

The flags in columns "Root Node" and "Leaf Node" are usually stored in OLTP source tables to enable a construction of the hierarchy in a "bottom-up" manner in which the hierarchy flattening is done from the bottom-most component (leaf) to top-most component (root). The leaf node to be used for starting the hierarchy may be identified (start with condition with leaf_node='x'). On the other hand, if the business requirement is to construct the hierarchy in a top-down manner in which the hierarchy flattening is done from the top-most component (root) to the bottom-most component (leaf), then the start may be specified as start with root_node='x'. OLTP system tables have table columns to store one or both of these flags.

Data warehouse 104 is generally designed for query and analysis rather than for transaction processing. Data warehouse 104 may store data derived from transaction data including hierarchy data, and may also include data from other sources. Data warehouse 104 is designed to accommodate ad hoc queries and data analysis and enable separation of analysis workload from transaction workload. Data warehouse 104 enables an organization to consolidate data from various sources. Various schemas may be used to store information in data warehouse 104. A schema may be a collection of database objects, including tables, views, indexes, synonyms, etc. One commonly used schema is a star schema that comprises one or more fact tables and dimension tables associated with the fact tables.

Storing hierarchy data in multiple parent-child relationship records, as depicted in Table A, is not conducive to analysis and query operations that are typically performed on data stored in data warehouse 104. For example, storing hierarchical data in multiple records is ill suited to performing operations such as rollup operations, hierarchy traversal operations (e.g., in a human resources application or for drawing components of a user interface), aggregation operations (e.g., in a financial application), and the like—these operations are very difficult to perform using records that only store individual parent-child relationships. Accordingly, when hierarchy data is stored in a data warehouse such as data warehouse 104, it is stored in a "flattened" form that is better suited for performing typical data warehouse operations. For example, as depicted in FIG. 1A, data warehouse 104 stores flattened hierarchy data 108.

Table B depicts an example of how hierarchy data may be stored in a flattened form. Table B comprises multiple records (each row is a record), each record storing flattened information for a hierarchal path in hierarchy 200 from the root node to a leaf node. The format in which the hierarchical data is stored in Table B is known as the flattened hierarchy format. Each record in Table B contains five fields C1, C2, C3, C4, and C5. For a record storing a hierarchical path, each field in the record stores a value representing a component involved in the hierarchical path stored by the record. The fields of a record are such that they define the hierarchical path stored by the record. For example, the fields depicted in Table B specify an ordering that indicates the hierarchical path between the components stored by the record. For example, for each record in Table B, field C1 stores a component value representing the top component in the hierarchical path stored by the record, field C2 stores a component value corresponding to the child of the component stored in field C1, field C3 stores a component value corresponding to the child of the component stored in field C2, field C4 stores a component value corresponding to the child of the component stored in field C3, a field C5 stores a component value corresponding to the child of the component stored in field C4. The number of fields in the records may be different in different data warehouse applications and may also depend upon the number of levels in the hierarchy for which information is stored.

TABLE B

Hierarchy data stored in a data warehouse

| C1 | C2 | C3 | C4 | C5 |
|----|----|----|----|----|
| A | B | D |   |   |
| A | B | E |   |   |
| A | C | F |   |   |
| A | C | G | H |   |
| A | C | G | I |   |

Table B represents one way in which the hierarchy data may be stored in a data warehouse. In alternative embodiments, depending upon the applications for which the data is to be used, the data may also be stored in other industry-standard ways such as in a bottom-up manner or in a top-down manner. In some embodiments, the empty fields of a record (e.g., fields C4 and C5 for the first record in Table B) are padded with the value in the last non-empty field of the record. For example, for the first record, the value D may be entered in fields C4 and C5.

Figure 1B:
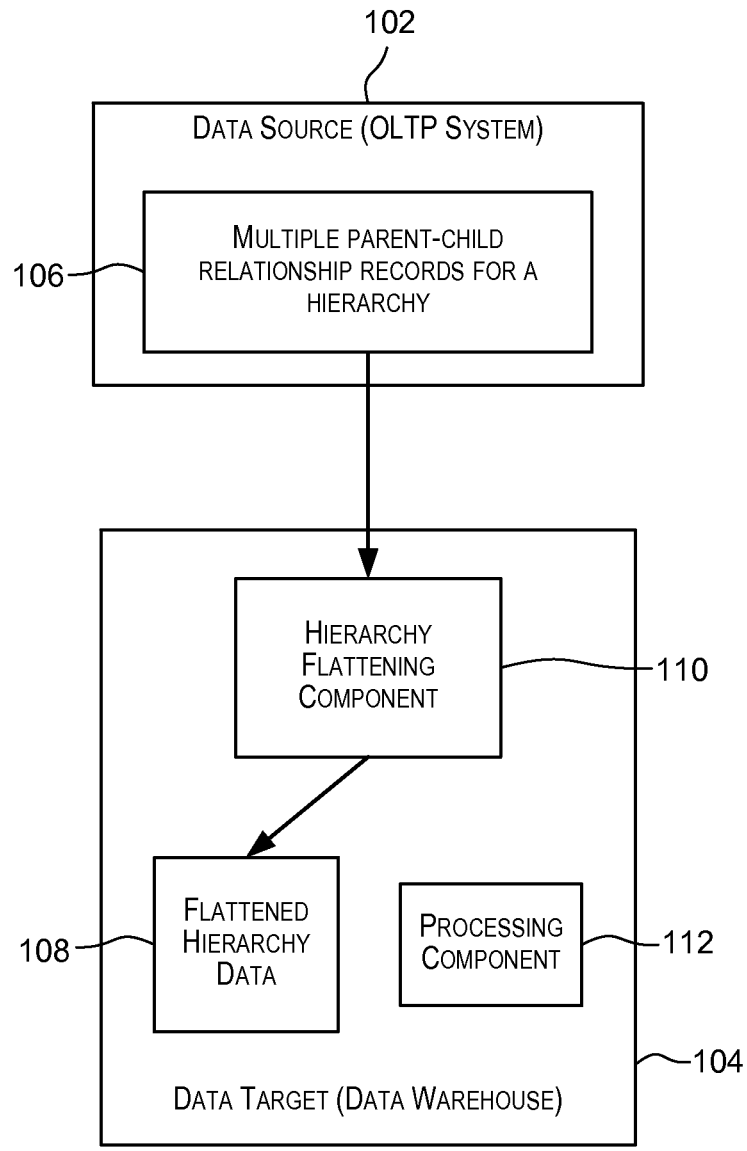
FIG. 1B depicts another simplified block diagram of a system that may incorporate an embodiment of the present invention.

According to an embodiment of the present invention, hierarchy flattening component 110 is configured to extract hierarchy data from the multiple parent-child relationship records, flatten the hierarchy data, create records for storing the flattened hierarchy information, and facilitate loading of the records into data warehouse 104. Hierarchy flattening component 110 may be implemented in software (e.g., code, program, instructions) executed by a processor, in hardware, or in combinations thereof. In one embodiment, as depicted in FIG. 1A, hierarchy flattening component 110 executes in the memory space of OLTP system 102 and forwards records storing flattened hierarchy data to data warehouse 104 for loading into data warehouse 104. The flattened hierarchy data comprises data identifying hierarchical paths in the hierarchy. In alternative embodiments, such as the embodiment depicted in FIG. 1B, hierarchy flattening component 110 may be implemented and executed on data warehouse 104. In such an embodiment, hierarchy flattening component 110 may access the multiple parent-child relationship records from data source 102, perform the hierarchy flattening, and provide records storing the flattened hierarchy data for storage in data warehouse 104. Since the hierarchy flattening is performed on the data warehouse, such an embodiment may be used in ELT architectures where transformations are performed in the data warehouse.

In yet other embodiments, the functions performed by hierarchy flattening component 110 may be split between hierarchy flattening component 110 and processing component 112 in data warehouse 104. As described above, the hierarchy flattening process may be performed without the need for an ETL tier or for ETL tools such as those provided by Informatica.

In one embodiment, hierarchy flattening is performed using one or more database functions, one or more filters, and a parser. The database functions are used to build, in the database server memory of the data source, a representation of hierarchical paths for a hierarchy. The hierarchical paths may be represented by strings, with each string representing a particular hierarchical path. In one embodiment, for a string representing a hierarchical path, the string variables identify components involved in the hierarchal path. The string variables may be separated by delimiters and the order of the variables in the string specify the hierarchical path represented by the string. Filters may then be used to eliminate those hierarchical paths that are not of interest and are not to be stored in the data warehouse. The filtering process may be performed by hierarchy flattening component 110 in the database server memory on the data source. For example, in one application, only those hierarchical paths tracing from a root component to a leaf component in a hierarchy may be of interest. In such an embodiment, hierarchical paths that do not trace a path from a leaf component to a root component of the hierarchy may be filtered out in the filtering phase.

Hierarchy flattening component 110 may then create records for the strings selected from the filtration phase to store data for hierarchical paths represented by the selected strings. In one embodiment, each selected string is parsed using parsing logic to extract the string variables representing components involved in the hierarchical path represented by the string. The components extracted from a string representing a hierarchical path may then be stored in separate fields of the record created for the string. For example, in one embodiment, records may be created for a set of selected strings with each record having fields C1, C2, C3, C4, and C5 as depicted in Table B. For a selected string, components extracted from the string by the parser are then stored in the appropriate fields of the record. The records storing the flattened hierarchy data may then be loaded into data warehouse 104.

In one embodiment, the flattening of the hierarchy data is done using a CONNECT_BY database function such as a SYS_CONNECT_BY_PATH database function that is executed by hierarchy flattening component 110. The SYS_CONNECT_BY_PATH function is recursively applied to the multiple parent-child relationship records. The output of the SYS_CONNECT_BY_PATH function is a set of strings representing hierarchy paths in a hierarchy. In one embodiment, the output of the SYS_CONNECT_BY_PATH function is a set of strings, wherein, for each component in the hierarchy, the set of strings comprises a string specifying a path from a root component of the hierarchy to the component.

For example, the following SQL code snippet using the SYS_CONNECT_BY_PATH database function may be used to get a set of strings representing hierarchical paths for the hierarchy represented by the records stored in Table A and corresponding to hierarchy 200 depicted in FIG. 2. In the following example, the "/" character is used as a delimiter to separate the components involved in a hierarchical path.

SELECT SYS_CONNECT_BY_PATH(component_value, '/') "Path"
   FROM Table_A
   START WITH component_value='A'
   CONNECT BY PRIOR child=parent;

The START WITH clause may be used to indicate the starting hierarchy component or level.

The execution of the above code snippet outputs a set of strings as follows:
/A
/A/B
/A/B/D
/A/B/E
/A/C
/A/C/F
/A/C/G
/A/C/G/H
/A/C/G/I As can be seen above, the strings output by the SYS_CONNECT_BY_PATH function comprise, for each component in the hierarchy, a string tracing a path from the root of the hierarchy to that component.

Hierarchy flattening component 110 may then apply one or more filters to the strings output by the SYS_CONNECT_BY_PATH function to select a set of strings that satisfy the filter. The one or more filters that are applied may depend on the application and the business intelligence that will utilize the data stored in the data warehouse. For example, in one embodiment, a filter may be applied such that only those strings which trace a path from the root of the hierarchy to a leaf of the hierarchy are selected. Accordingly, for the previous example this would result in the selection of the following strings:
/A/B/D
/A/B/E
/A/C/F
/A/C/G/H
/A/C/G/I Hierarchy flattening component 110 may also be configured to create records for the selected strings. In one embodiment, a record is generated for each selected string to store data related to the hierarchical path represented by the selected string. For each selected string, the flattened hierarchical path data represented by the string may be stored in the record created for the strings. The records storing the flattened hierarchical path data may then be loaded and stored in data warehouse 104. In one embodiment, hierarchy flattening component 110 may forward the records storing the flattened hierarchy data to processing component 112 of data warehouse 104. Processing component 112 may then store the records in a table of data warehouse 104. For example, five records may be created for storing hierarchical path data for the five selected strings "/A/B/D", "/A/B/E", "/A/C/F", "/A/C/G/H", and "/A/C/G/I". The five records may then be stored in a table of data warehouse 104 such as Table B shown above.

Different techniques may be used to store hierarchical paths information represented by the selected strings into the records created for the selected strings. In one embodiment, hierarchy flattening component 110 is configured to parse each selected string to extract the component values in the string (that are separated by delimiters). For example, string "/A/B/D" may be parsed to extract components "A", "B", and "D", string "/A/B/E" may be parsed to extract components "A", "B", and "E", string "/A/C/F" may be parsed to extract components "A", "C", and "F", and so on. The delimiters in a string may be used to parse the string. For a selected string, the components parsed from the string may then be stored in separate fields of the record created for storing hierarchy path data represented by the string. For example, if the records created for the selected strings had fields as shown in Table B, then for string "/A/B/D", the component value "A" extracted from the string is stored in field C1, component value "B" is stored in field C2, and component value "D" is stored in field C3 of the record created for the string. Fields C4 and C5 may be left blank. In some embodiments, fields C4 and C5 may be padded with component value "D".

In this manner, hierarchy flattening component 110 is configured to flatten the hierarchy data stored in multiple parent-child relationship records and generate records storing flattened hierarchical path information. These records may then be loaded into a table of data warehouse 104.

Figure 3:
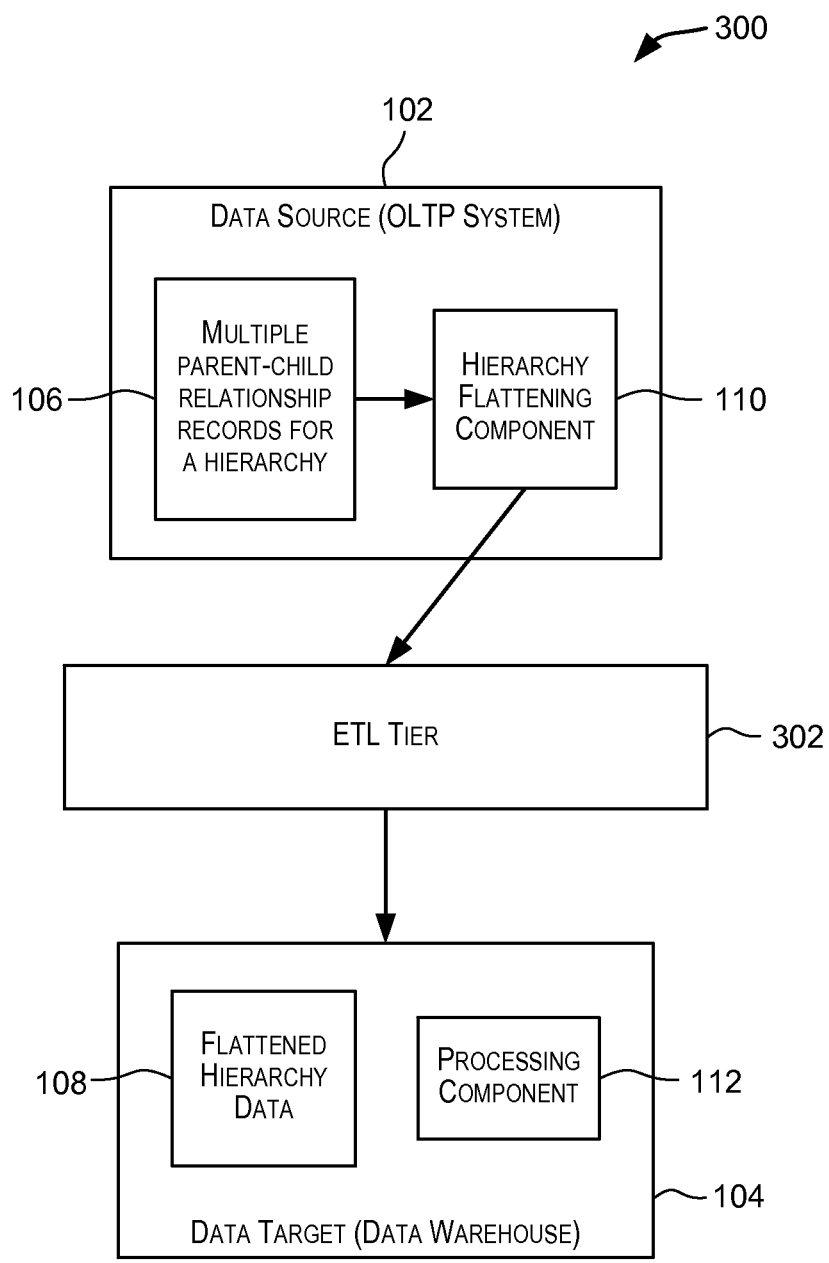
FIG. 3 depicts a simplified block diagram of another system that may incorporate an embodiment of the present invention.

FIG. 3 depicts a simplified block diagram of another system 300 that may incorporate an embodiment of the present invention. Several of the components depicted in FIG. 3 are the same as the components depicted in FIG. 1A and have been referenced using the same reference numbers. In the embodiment depicted in FIG. 3, an ETL layer 302 is interposed between data source 102 and data warehouse 104. In this embodiment, records storing flattened hierarchy data created by hierarchy flattening component 110 may be forwarded to ETL tier 302. ETL tier 302 may perform one or more operations, such as transformations, on the records and then load the records into data warehouse 104. In some embodiments, some of the functions performed by hierarchy flattening component 110 may be performed by ETL tier 302. However, ETL tier 302 is not essential to embodiments of the present invention.

Figure 4:
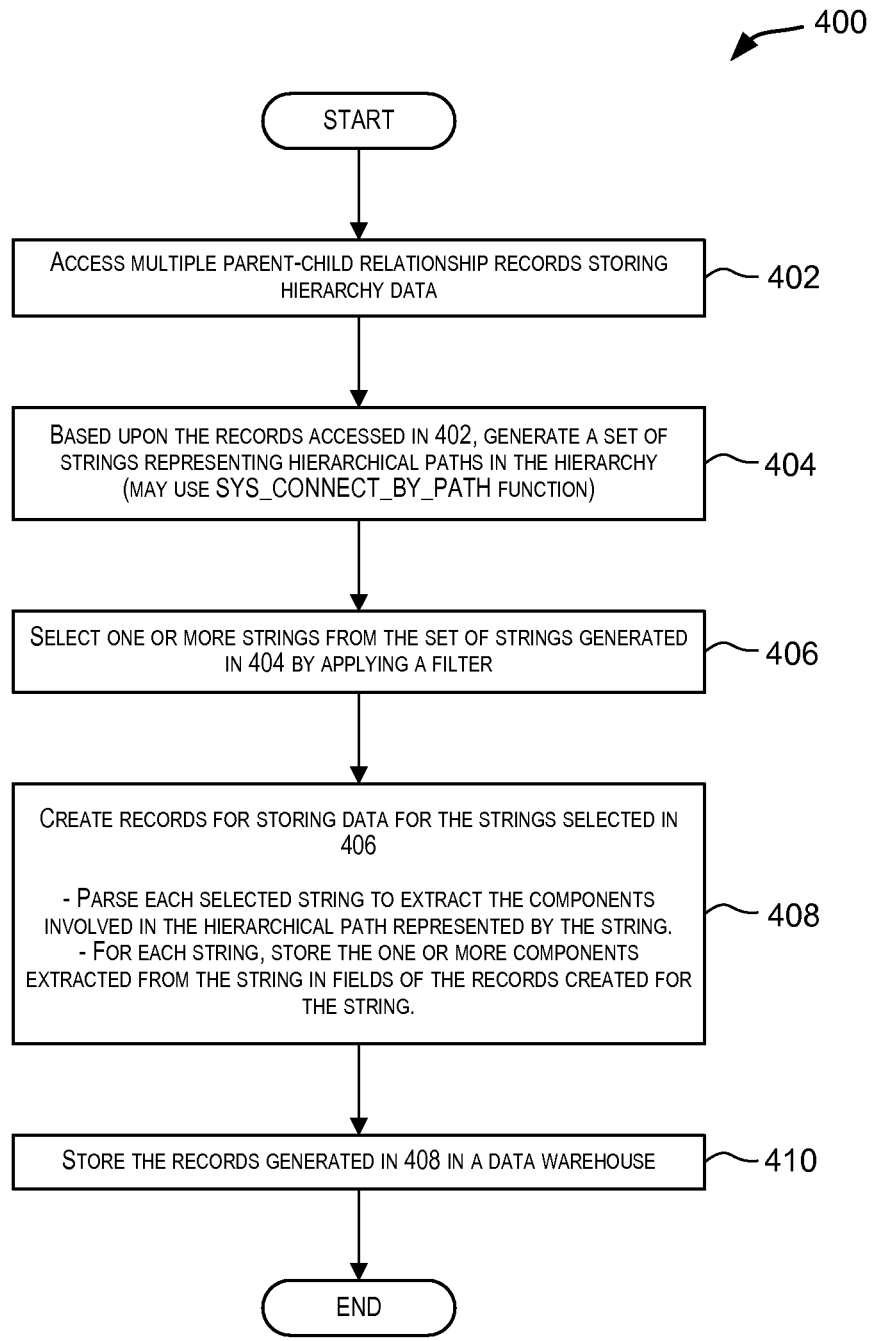
FIG. 4 depicts a simplified flowchart showing a method of flattening hierarchies and storing the flattened information into a data warehouse according to an embodiment of the present invention.

FIG. 4 depicts a simplified flowchart 400 showing a method of flattening hierarchies and storing the flattened information into a data warehouse according to an embodiment of the present invention. The processing depicted in FIG. 4 may be performed by software executed by a processor, hardware, or combinations thereof. The processing may be performed on the data source, on the data warehouse, or the processing may be split between the data source and the data warehouse.

As depicted in FIG. 4, the multiple parent-child relationship records storing data for a hierarchy to be flattened are accessed (step 402). The multiple parent-child records may be stored in a single table on a data source, spread across multiple tables on a data source, or may even be spread across multiple data sources. Each parent-child relationship record stores information identifying between a parent component and its child component in the hierarchy.

Based upon the multiple parent-child relationship records, a set of strings is generated representing hierarchical paths in the hierarchy (step 404). The hierarchical path represented by a string may include one or more components of the hierarchy. The processing performed in 404 thus flattens the hierarchy and extracts hierarchical paths from the multiple parent-child relationship records. In one embodiment, a SYS_CONNECT_BY_PATH database function is used in 404. The SYS_CONNECT_BY_PATH function is recursively applied to the multiple parent-child relationship records. The output of the SYS_CONNECT_BY_PATH function is a set of strings, wherein, for each component in the hierarchy, the set of strings comprises a string specifying a path from a root component of the hierarchy to the component. An example of the output generated by the SYS_CONNECT_BY_PATH function is explained above. Various other functions may be used in alternative embodiments.

One or more strings are then selected from the set of strings generated in 404 by applying a filter to the set of strings generated in 404 (step 06). In one embodiment, the selected one or more strings (filtered set of strings) comprises only those strings from the set of strings generated in 404 that satisfy the one or more filters applied in 406. Filters may also be defined to exclude certain strings from the set of strings generated in 404. Accordingly, a filtered set of strings are identified in 406. Filtration in 406 is done to eliminate hierarchical paths that are not of interest and are not to be stored in the data warehouse Different filters with different criteria may be applied based upon the business logic and the application for which the data stored in the data warehouse is to be used. In this manner, only those hierarchical paths from the hierarchy that are of interest are selected in 406 for eventual storage in the data warehouse. For example, in one embodiment, a filter may be applied such that only those strings tracing hierarchical paths from a leaf component to a root component may be included in the filtered set of strings—in this manner, partially constructed hierarchical paths are eliminated. In another embodiment, a filter may be configured based upon the levels of the hierarchy. For example, a start level and an end level may be specified and only those strings representing hierarchical paths starting at the start level and ending at the end level in the hierarchy may be selected. It is also possible that application of the filter may result in all or none of the strings in the set of strings generated in 404 to be included in the filtered set of strings. The filtering performed in 406 is not essential to the present invention and may be omitted in some embodiments.

Records are then created for the one or more strings selected in 406, i.e., for the strings in the filtered set of strings (step 408). In one embodiment, a record is created for each string included in the filtered set of strings. Different techniques may be used for creating the records in 408. According to one technique, each string in the filtered set of strings is parsed to extract the individual components involved in the hierarchal path represented by the string. For example, string "/A/B/D" may be parsed to extract components "A", "B", and "D", string "/A/B/E" may be parsed to extract components "A", "B", and "E", string "/A/C/F" may be parsed to extract components "A", "C", and "F", and so on. For each string in the filtered set of strings, the component values extracted by parsing the string may then be individually stored in separate fields of the record created for that string. For example, if the records created for the selected strings had fields as shown in Table B, then for string "/A/B/D", the component value "A" extracted from the string is stored in field C1, component value "B" is stored in field C2, and component value "D" is stored in field C3. Fields C4 and C5 may be left blank. In some embodiments, fields C4 and C5 may be padded with component value "D".

The records generated in 408 may then be stored in the data warehouse (step 410).

In the manner described above, hierarchical data stored in multiple parent-child relationship records is flattened and stored in records with each record storing information for a hierarchy path in the hierarchy. While in the above example the multiple parent-child relationship records store data for a single hierarchy, in alternative embodiments, the multiple parent-child relationship records may store data for multiple hierarchies. The processing depicted in FIG. 4 and described above may be used to flatten the multiple hierarchies.

Another example is described below of how an embodiment of the present invention may be used to flatten hierarchies. Table C shown below stores parent-child relationship records for three different hierarchies. In this example, a record stores the relationship between a parent (prnt column), and its children (child low or chlo column, and child high or chhi column), where the value of the parent falls between the child low and child high values. The ID column in a record identifies a particular hierarchy for which data is stored by the record. This example is based upon Oracle value set hierarchies. Value sets, a concept within the flexfield framework in Oracle applications, record the values that a flexfield can have. Flexfields are commonly used to store segment values that describe entities such as GL accounts, Assets, Inventory items, etc. The hierarchies store the relationships between a parent and a RANGE of child values. Examples of simpler parent-child relationship include BOM (bill of materials) in manufacturing application, WBS (work breakdown structure) in project application, etc.

TABLE C

Table "table_multiple_hierarchy" storing information for three hierarchies

| ID | PRNT | CHLO | CHHI |
|---|---|---|---|
| 1 | 250 | 225 | 275 |
| 1 | 200 | 150 | 250 |
| 1 | 10 | 100 | 200 |
| 2 | 350 | 325 | 375 |
| 2 | 300 | 350 | 400 |
| 2 | 30 | 300 | 301 |
| 3 | 510 | 511 | 519 |
| 3 | 500 | 510 | 550 |
| 3 | 50 | 500 | 600 |

The data for the hierarchies stored by Table C may be extracted using CONNECT BY and START WITH clause. The hierarchies are traversed from child to parent. For traversal from parent to child, reverse prior clause may be used starting with parent nodes.

select id, level, prnt, chlo, chhi,
SYS_CONNECT_BY_PATH(prnt||'"'||chhi||'"'||chlo, '\')
"Path"
from table_multiple_hierarchy
CONNECT BY prior prnt=chlo
START WITH chlo in (511, 325, 225);

The above SQL code returns a set of strings representing hierarchical paths in the three hierarchies stored in Table C. In each string, a '\' character is used to delimit the hierarchical components in the string. A filter may then optionally be applied to select a set of desired strings from the set of strings resulting from execution of the SYS_CONNECT_BY_PATH function. The filter that is applied may depend upon the business application. The set of strings selected from the filtering may then be parsed to extract individual components from each string. The '\' delimiter may be used for the extraction. Various techniques may be used for the extraction. For each selected string, the components extracted from the string may then be used to form a record for storing the hierarchy information represented by that string. The generated records may then be stored in a target store such as a table in a data warehouse.

As described above, embodiments of the present invention provide techniques for flattening hierarchies and transposing row-to-columns and storing the flattened hierarchy data in a data warehouse. The framework is very flexible and applicable to different forms of hierarchies. In one embodiment, by processing the parent-child relationship record in bulk in the memory of the data source itself, the time consuming row-by-row processing in the ETL tier is avoided. Data warehouse engineers no longer have to depend upon the row-by-row feature in ETL engines to extract hierarchies. Embodiments of the present invention thus enable data warehouse engineers to design programs that provide better throughput in flattening hierarchies.

Embodiments of the present invention obviate the need for a powerful and dedicated ETL server to perform hierarchy flattening. IT departments no longer need to invest in dedicated hardware and software resources used to run ETL engines. The cost of ownership of a data warehouse is thus reduced requiring less processing resources. Further, when data in the data warehouse is being updated users are not allowed to access the data warehouse system leading to downtime of the data warehouse. Embodiments of the present invention provide faster ways (as compared to the traditional ETL approach) for extracting and storing hierarchy data into the data warehouse and thus reduce the system downtime.

Embodiments of the present invention enable designers to write programs to flatten hierarchies, which are more compact, less prone to errors and cost less to maintain. In traditional approaches, to flatten hierarchies, ETL designers had to write several software modules that perform certain atomic operations. When executed in a particular sequence, these modules processed the source data from the OLTP system, and the last module in the sequence output the flattened hierarchy information. As the number of modules in a software system increases, the complexity and the cost, to the IT department, of maintaining it increase as well. Embodiments of the present invention enable hierarchy flattening programs to be more compact, elegant, and cheap-to-maintain. Embodiments of the present invention thus provide a scalable solution for flattening hierarchies.

Figure 5:
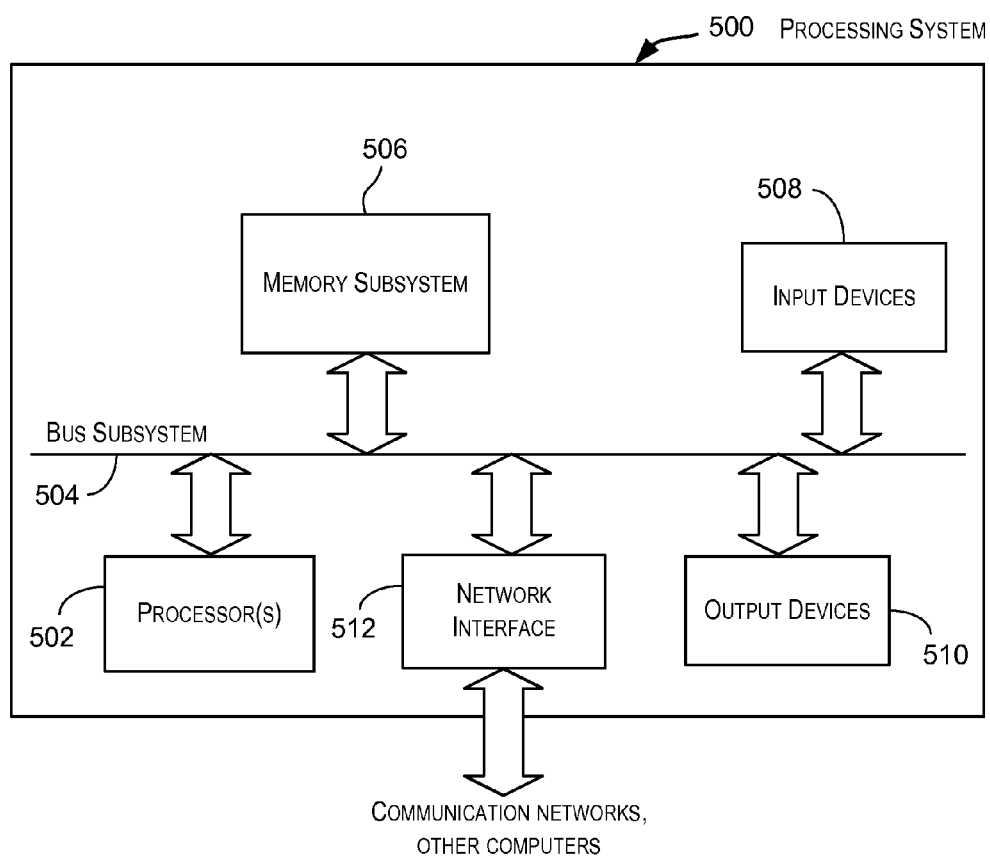
FIG. 5 is a simplified block diagram of a processing system that may be used to practice an embodiment of the present invention.

FIG. 5 is a simplified block diagram of a processing system 500 that may be used to practice an embodiment of the present invention. System 500 may be a data source system or a data warehouse system or may be part of an ETL tier. System 500 may be configured to perform the processing depicted in FIG. 4 and described above.

As shown in FIG. 5, system 500 includes a processor 502 that communicates with a number of peripheral devices via a bus subsystem 504. These peripheral devices may include a memory subsystem 506, input devices 508, output devices 510, and a network interface subsystem 512. Bus subsystem 504 provides a mechanism for letting the various components and subsystems of system 500 communicate with each other as intended. Although bus subsystem 504 is shown schematically as a single bus, alternative embodiments of the bus subsystem may utilize multiple busses.

Processor 502 is configured to perform processing performed by system 500. For example, processor 502 may be configured to execute programs, code, or instructions to perform transformation and load operations according to an embodiment of the present invention. Processor 502 may also control other subsystems or devices.

Input devices 508 enable a user to interact with and provide information to system 500. Input devices 508 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 500. Input devices 508 typically allow a user to select objects, icons, text and the like that appear on a monitor via a command such as a click of a button or the like.

Output devices 510 may include wired or wireless devices such as a display subsystem, a printer, a fax machine, or non-visual displays such as audio output devices, etc.

Examples of a display subsystem include a cathode ray tube (CRT), a flat-panel device such as a liquid crystal display (LCD), a projection device, etc. In general, an output device may refer to any device or mechanism for outputting information from system 500. For example, the trace files may be viewed by a user using an output device.

Network interface subsystem 512 provides an interface to other computer systems, and networks. Network interface subsystem 512 serves as an interface for receiving data from other sources and for transmitting data to other sources from system 500. Embodiments of network interface subsystem 512 include an Ethernet card, a modem (telephone, satellite, cable, ISDN, etc.), (asynchronous) digital subscriber line (DSL) units, FireWire interface, USB interface, and the like. For example, subsystem 512 may be coupled to a computer network, to a FireWire bus, or the like. In other embodiments, network interface subsystem 512 may be physically integrated on the motherboard of system 500, and may be a software program, such as soft DSL, or the like.

Memory subsystem 506 provides a computer readable medium for storing the basic programming and data constructs that provide the functionality of the present invention. For example, memory subsystem 506 may provide a computer-readable medium for a program, code modules, or instructions implementing the functionality of the present invention. These software modules may be executed by processor(s) 502. Memory subsystem 506 may also provide a repository for storing other data used in accordance with the present invention.

Memory subsystem 506 may include a number of memories including a main random access memory (RAM) for storage of instructions and data during program execution and a read only memory (ROM) in which fixed instructions are stored. RAM is generally semiconductor-based memory that can be read and written by processor 502. The storage locations can be accessed in any order. RAM is generally understood to refer to volatile memory that can be written to as well as read. There are various different types of RAM.

Memory subsystem 506 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 500 can be of various types including a personal computer, a portable computer, a workstation, a network computer, a mainframe, a kiosk, or any other data processing system. Due to the ever-changing nature of computers and networks, the description of system 500 depicted in FIG. 5 is intended only as a specific example for purposes of illustrating the preferred embodiment of a processing system. Many other configurations having more or fewer components than the system depicted in FIG. 5 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc., and the like. Further, use of different types of operating systems is contemplated, such as Windows®, WindowsXP®, WindowsNT®, or the like from Microsoft Corporation, Solaris from Sun Microsystems, LINUX, UNIX, and the like.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method comprising:
    loading, from an online transaction processing (OLTP) system, a plurality of records, each of the records of the plurality of records identifies a parent-child relationship between two components in a hierarchy;
    after loading the plurality of records from the OLTP system, storing the plurality of records in a data warehouse that is separate from the OLTP system;
    after storing the plurality of records in the data warehouse, generating, at the data warehouse, a first set of strings based upon hierarchy data for the hierarchy stored in the plurality of records at the data warehouse by applying a recursive function to the plurality of records, the first set of strings representing hierarchical paths in the hierarchy, each string in the first set of strings comprising one or more components in the hierarchy and wherein the one or more components in the string are arranged in an order indicative of a hierarchical path represented by the string;
    filtering the first set of strings to create a second set of strings, at the data warehouse, so that strings of the first set of strings that trace a path from a root of the hierarchy to a leaf of the hierarchy are selected to create the second set of strings, wherein the second set of strings have fewer than all strings from the first set of strings in order to perform hierarchical flattening of the plurality of records;
    creating, in the data warehouse, a particular record for each string in the second set of strings; and
    querying the data warehouse for the particular record for a string in the second set of strings.

2. The method of claim 1 wherein, for each component in the hierarchy, the first set of strings comprises a string specifying a path from a root component of the hierarchy to the component.

3. The method of claim 1 wherein the creating comprises:
    for each particular string in the second set of strings,
        parsing the particular string to extract one or more hierarchy components from the particular string, and storing the one or more hierarchy components extracted from the particular string in a record created for the particular string.

4. The method of claim 3 wherein the storing comprises storing each hierarchy component extracted from the particular string in a separate field of the record created for the particular string;

wherein every record created for a string in the second set of strings has a same quantity of fields as every other record created for other strings in the second set of strings; and wherein at least two strings in the second set of strings represent different quantities of hierarchical components.

5. The method of claim 1 wherein the plurality of records is stored on a data source system and the generating and creating are performed on the data source system, the method further comprising storing the particular record on a target system different from the data source system.

6. The method of claim 1 wherein generating the first set of strings comprises using a SYS_CONNECT_BY_PATH function to generate the first set of strings.

7. The method of claim 1, wherein generating comprises invoking a database function which, for every particular component in the hierarchy:

follows parent-child relationships in the hierarchy data to determine a particular path between a root component of the hierarchy and the particular component, including all intermediate components between the root component and the particular component in the particular path, and generates a particular string that specifies all components in the particular path.

8. The method of claim 1, wherein each record in the plurality of records specifies both a parent component and a child component, and wherein said generating comprises:

for each particular record in the plurality of records, determining whether a field in the particular record indicates that the child component specified in the particular record is a leaf component that has no children; and in response to determining that the child component specified in the particular record is a leaf component that has no children, selecting the child component as a starting point to determine a path from the child component to a root component of the hierarchy.

9. The method of claim 1, wherein the first set of strings includes at least one string that specifies a path that excludes all leaf components of the hierarchy; and wherein filtering the first set of strings comprises filtering the first set of strings by adding, to the second set of strings, only strings from the first set of strings that specify a path from a root component of the hierarchy to a leaf component of the hierarchy.

10. The method according to claim 1, wherein the data warehouse comprises a data store configured for query and analysis.

11. The method according to claim 1, further comprising analyzing the particular record received in response to the query.

12. A non-transitory computer-readable medium storing a plurality of instructions executable by one or more processors, the plurality of instructions comprising:

instructions that cause the processor to load, from an online transaction processing (OLTP) system, a plurality of records, each of the records of the plurality of records identifies a parent-child relationship between two components in a hierarchy;

instructions which, after the loading of the plurality of records from the OLTP system, cause the processor to store the plurality of records in a data warehouse that is separate from the OLTP system;

instructions which, after the storing of the plurality of the data records in the data warehouse, cause the processor to generate, at the data warehouse, a first set of strings based upon hierarchy data for the hierarchy stored in the plurality of records at the data warehouse by applying a recursive function to the plurality of records, the first set of strings representing hierarchical paths in the hierarchy, each string in the first set of strings comprising one or more components in the hierarchy and wherein the one or more components in the string are arranged in an order indicative of a hierarchical path represented by the string;

instructions that cause the processor to filter the first set of strings to create a second set of strings, at the data warehouse, so that strings of the first set of strings that trace a path from a root of the hierarchy to a leaf of the hierarchy are selected to create the second set of strings, wherein the second set of strings have fewer than all strings from the first set of strings in order to perform hierarchical flattening of the plurality of records;

instructions that cause the processor to create, in the data warehouse, a particular record for each string in the second set of strings; and querying the data warehouse for the particular record for a string in the second set of strings.

13. The computer-readable medium of claim 12 wherein the instructions that cause the processor to generate the first set of strings comprises instructions that cause the processor to execute a SYS_CONNECT_BY_PATH function to generate the first set of strings.

14. The computer-readable medium of claim 12, wherein the instructions that cause the processor to generate comprise instructions that cause the processor to invoke a database function which, for every particular component in the hierarchy:

follows parent-child relationships in the hierarchy data to determine a particular path between a root component of the hierarchy and the particular component, including all intermediate components between the root component and the particular component in the particular path, and generates a particular string that specifies all components in the particular path.

15. A system comprising:

a processor; and a memory coupled to the processor;

wherein the processor is configured to load, from an online transaction processing (OLTP) system, a plurality of records, each of the records of the plurality of records identifies a parent-child relationship between two components in a hierarchy;

wherein the processor is configured, after the loading of the plurality of records from the OLTP system, to store the plurality of records in a data warehouse that is separate from the OLTP system;

wherein the processor is configured, after the storing of the plurality of the data records in the data warehouse, to generate, at the data warehouse, a first set of strings based upon hierarchy data for the hierarchy stored in the plurality of records at the data warehouse by applying a recursive function to the plurality of records, the first set of strings representing hierarchical paths in the hierarchy, each string in the first set of strings comprising one or more components in the hierarchy and wherein the one or more components in the string are arranged in an order indicative of a hierarchical path represented by the string;

wherein the processor is configured to filter the first set of strings to create a second set of strings, at the data warehouse, so that strings of the first set of strings that trace a path from a root of the hierarchy to a leaf of the hierarchy are selected to create the second set of strings, wherein the second set of strings have fewer than all strings from the first set of strings in order to perform hierarchical flattening of the plurality of records;

wherein the processor is configured to create, in the data warehouse, a particular record for each string in the second set of strings; and querying the data warehouse for the particular record for a string in the second set of strings.

16. The computer-readable medium of claim 12, wherein each record in the plurality of records specifies both a parent component and a child component, and wherein said generating comprises:

for each particular record in the plurality of records, determining whether a field in the particular record indicates that the child component specified in the particular record is a leaf component that has no children; and in response to determining that the child component specified in the particular record is a leaf component that has no children, selecting the child component as a starting point to determine a path from the child component to a root component of the hierarchy.

17. The computer-readable medium of claim 12, wherein the first set of strings includes at least one string that specifies a path that excludes all leaf components of the hierarchy; and wherein the instructions that cause the processor to filter the first set of strings comprise instructions that cause the processor to filter the first set of strings by adding, to the second set of strings, only strings from the first set of strings that specify a path from a root component of the hierarchy to a leaf component of the hierarchy.

18. The system of claim 15, wherein the processor is configured to invoke a database function which, for every particular component in the hierarchy:

follows parent-child relationships in the hierarchy data to determine a particular path between a root component of the hierarchy and the particular component, including all intermediate components between the root component and the particular component in the particular path, and generates a particular string that specifies all components in the particular path.

19. The system of claim 15 wherein the processor is configured to generate the first set of strings using a SYS_CONNECT_BY_PATH function.

20. The system of claim 15, wherein each record in the plurality of records specifies both a parent component and a child component, and wherein:

for each particular record in the plurality of records, said processor is configured to determine whether a field in the particular record indicates that the child component specified in the particular record is a leaf component that has no children; and said processor is configured, in response to determining that the child component specified in the particular record is a leaf component that has no children, to select the child component as a starting point to determine a path from the child component to a root component of the hierarchy.

21. The system of claim 15, wherein the first set of strings includes at least one string that specifies a path that excludes all leaf components of the hierarchy; and wherein processor is configured to filter the first set of strings by adding, to the second set of strings, only strings from the first set of strings that specify a path from a root component of the hierarchy to a leaf component of the hierarchy.

* * * * *

UNITED STATES PATENT AND TRADEMARK OFFICE
CERTIFICATE OF CORRECTION

| | | |
|---|---|---|
| PATENT NO. | : 9,659,073 B2 | Page 1 of 1 |
| APPLICATION NO. | : 12/141409 | |
| DATED | : May 23, 2017 | |
| INVENTOR(S) | : Shaik | |

It is certified that error appears in the above-identified patent and that said Letters Patent is hereby corrected as shown below:

On the Title Page

On page 2, Column 1, under Other Publications, Line 11, delete "Herzlia," and insert -- Herzliya, --, therefor.

On page 2, Column 2, under Other Publications, Line 47, delete "dowloaded" and insert -- downloaded --, therefor.

In the Specification

In Column 7, Line 67, delete "parent;" and insert -- parent. --, therefor.

In Column 10, Line 6, after "warehouse" insert -- . --.

In Column 11, Line 40, delete "225);" and insert -- 225). --, therefor.

In Column 13, Line 60, delete "micro processors" and insert -- microprocessors --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*